Figures 1, 2, 3:
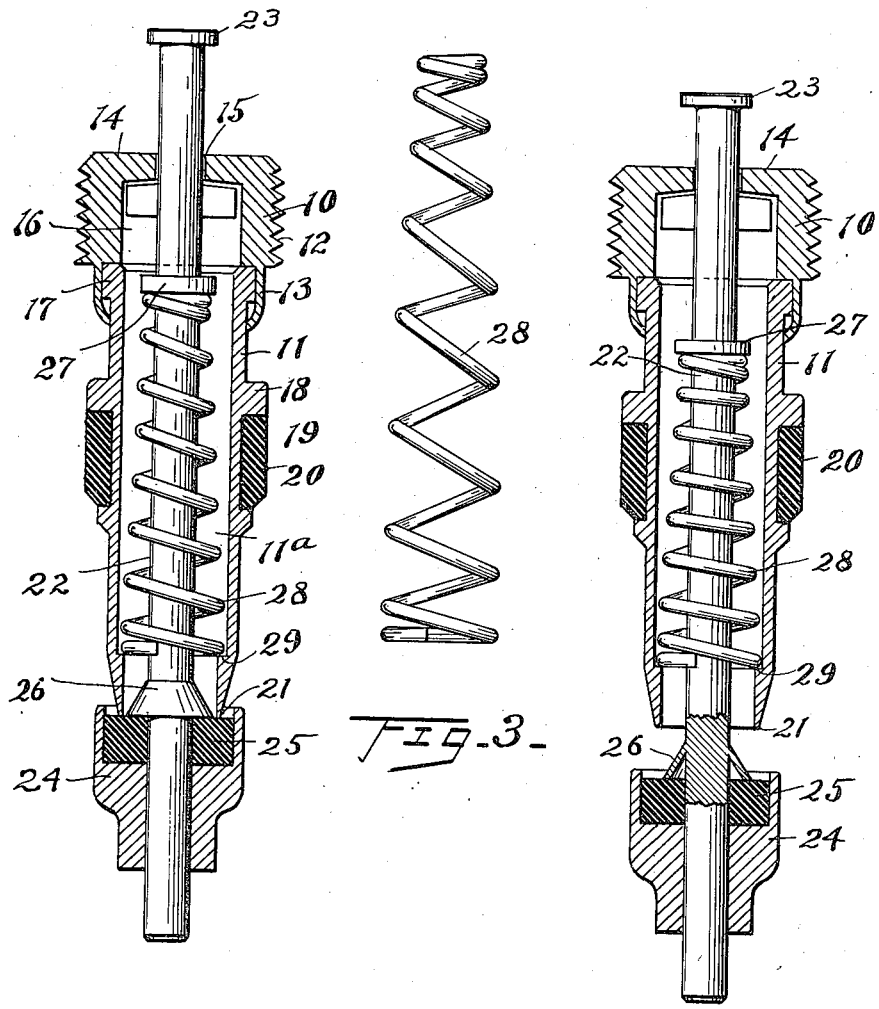

July 28, 1936. J. C. CROWLEY 2,048,843
VALVE INSIDES
Filed June 25, 1932

INVENTOR
JOHN C. CROWLEY.
Kurs Hudson & Kent
Attys

Patented July 28, 1936

2,048,843

UNITED STATES PATENT OFFICE 2,048,843

VALVE INSIDES

John C. Crowley, Cleveland Heights, Ohio, assignor to The Dill Manufacturing Company, Cleveland, Ohio, a corporation of Ohio Application June 25, 1932, Serial No. 619,202

3 Claims. (Cl. 152—12)

The present invention relates to valve insides which, as is well known, are used in the valve stems of pneumatic automobile tires and other air inflated articles.

An object of the invention is to provide a valve insides which is so constructed as to have maximum air passageways therethrough during the inflating or deflating of the tire or article, that is, during the time the valve proper of the insides is unseated.

Another object is to provide in a valve insides a valve spring that is so formed as not to restrict the air passageways through the insides, and particularly when the valve of the insides is unseated or opened.

Further and additional objects of the invention will more fully appear hereinafter during the following detailed description of an embodiment thereof, which is illustrated in the accompanying drawing, wherein Figure 1 is a longitudinal sectional view through the valve insides on a greatly enlarged scale and showing the valve proper of the insides in closed or seated position.

Fig. 2 is a view similar to Fig. 1, but shows the valve proper of the insides in unseated or opened position, and Fig. 3 is a detail view of the valve spring of the valve insides.

In the present disclosure it will be understood that the valve insides are intended primarily for use in the standard or conventional form of valve stem that is used with inner tubes for automobile tires, although the insides are not restricted to this precise use.

The standard or conventional valve stem has a bore therethrough which is threaded at its outer end for the purpose of receiving the threads upon a swivelled portion of the valve insides. The bore is also provided at a short distance from the threaded end of the stem with a reduced portion forming a shoulder against which a suitable packing member on the valve insides engages for the purpose of effecting an air-tight seal and thereby preventing the escape of air around the body of the valve insides.

It will be appreciated that the valve insides must be of small size, since it is arranged in the bore in the valve stem and that, therefore, the air passageways through the valve insides are of limited size with the result that any restriction thereof materially affects the speed at which the tire may be inflated or deflated.

As shown in Figs. 1 and 2, the body of the valve insides is formed of two parts, namely, the swivelled part 10 and the barrel part 11. The part 10 is provided with exterior threads 12 and has at its inner end a downwardly extending flange 13, the end of which is inwardly turned to enable the part 10 to be swivelly connected to the part 11. The part 10 is also provided with a relatively narrow bridge portion 14 extending diametrically across the same and provided with a central opening 15 communicating with a bore 16 in the part 10. This construction is well known and need not be described herein in further detail.

The part 11 of the valve insides is formed adjacent its upper end with an outturned flange 17 spaced from a second flange 18 and providing an annular recess therebetween which receives the inwardly turned end of the flange 13 on the part 10. This arrangement effects a swivel connection between the two parts of the body of the insides with the result that the part 11 when inserted into a valve stem can be forced longitudinally into proper position therein by the rotation of the part 10, the exterior threads 12 of which engage the interior threads of the valve stem. Adjacent the flange 18 a recess 19 is formed in the part 11 for the purpose of receiving a suitable packing member 20 which cooperates with the valve stem to form an air-tight connection between the stem and the body of the insides.

The lower end of the part 11 is externally tapered so that the lower edge of such part, indicated at 21, forms a relatively narrow valve seat.

A valve pin 22 extends through the body of the insides and has at its upper end a head 23, while its lower end is connected to a member 24 having packing 25 arranged in a recess at its upper end and forming the valve proper of the insides, the packing 25 of which is adapted to engage the seat 21 when the valve is in closed position. The valve pin 22 also is provided with an enlargement 26 adjacent the valve proper for the purpose of assisting in guiding the pin in its movements when the valve is seated or unseated. The pin is further provided within the body of the insides and adjacent the outer end of the part 11 with an annular flange 27, for a purpose later to be described.

Heretofore, in valve insides the coiled valve springs had the convolutions thereof of constant diameter from one end of the spring to the other end thereof. In those insides wherein the valve spring is located within the body of the insides the coiled spring of constant diameter has resulted in substantially restricting the air passageways through the insides, since, when the valve pin is depressed to unseat the valve proper the convolutions of the spring are brought closer together or into contact with each other and the external diameter of the spring is substantially increased. This increase in the external diameter of the valve spring causes the spring to substantially fill the bore through the body of the insides and to thus restrict the air passageway therethrough.

In order to obviate this restriction of the air passageway through the valve insides when the valve pin is depressed to unseat the valve proper, the present invention contemplates providing a coiled valve spring 28 that is tapered from one end to the other end thereof, that is the convolutions of the spring are of constantly varying diameter from end to end of the spring. As shown in the drawing, this tapered coil spring surrounds the valve pin 22 and is located within the body of the valve insides with the small end of the spring abutting the annular flange 27 on the pin 22 and the large end of the spring abutting a shoulder 29 formed in the wall of the bore 11a of the part 11 and located adjacent the tapered inner end thereof.

When it is desired to unseat the valve proper of the valve insides to inflate or deflate the tire, the valve pin 22 is depressed with the result that the spring 28 is compressed between the flange 27 on the pin and the shoulder 29 on the part 11, as shown in Fig. 2 of the drawing. Since the spring is a tapered coil spring, this compression thereof will not cause the convolutions of the spring to increase their diameter or to buckle and the result is that the air passageway through the insides is not restricted by the valve spring. The head 23 on the outer end of the pin provides a stop limiting the inward movement of the valve pin and preventing the convolutions of the spring from being brought together and thus completely closing the spring with the result that the passage of air is permitted between the coils of the spring.

Although a preferred embodiment of the invention has been illustrated and described herein, it should be understood that the invention is susceptible of various modifications and adaptations within the scope of the appended claims.

Having thus described my invention, I claim:

1. A valve insides comprising a body adapted to be arranged in a valve stem and having a bore therethrough, a valve pin extending through said body, a valve proper carried by said pin and adapted to seat on the end of said body, and a coil spring tapered from end to end surrounding said pin within the bore of said body and having one of its ends abutting means carried by the pin and its opposite end means carried by said body.

2. A valve insides comprising a body adapted to be arranged in a valve stem and having a bore therethrough, a valve pin extending through said body and carrying a valve proper adapted to seat on an end of said body, and a coil spring tapered from end to end arranged in the bore of said body and surrounding said pin with the small end of said spring abutting means located on said pin and the large end thereof abutting a shoulder formed in said body.

3. A valve insides comprising a body adapted to be arranged in a valve stem and having a bore therethrough and provided with an internal shoulder adjacent one end, a valve pin extending through said body and carrying a valve proper adapted to seat on an end of said body and provided with a head at its opposite end and with a flange located within said body, and a coil spring arrange in the bore of said body and surrounding said pin and abutting at its opposite ends said shoulder and said flange, the convolutions of said spring being of gradually increasing diameter from one end of the spring to the other end thereof.

JOHN C. CROWLEY.